United States Patent [19]

Ames et al.

[11] Patent Number: 5,017,926
[45] Date of Patent: May 21, 1991

[54] DUAL SATELLITE NAVIGATION SYSTEM

[75] Inventors: William G. Ames, Poway; Irwin M. Jacobs, La Jolla; Lindsay A. Weaver, Jr.; Klein S. Gilhousen, both of San Diego, all of Calif.

[73] Assignee: Qualcomm, Inc., San Diego, Calif.

[21] Appl. No.: 446,979

[22] Filed: Dec. 5, 1989

[51] Int. Cl.$^5$ .......................... H04B 7/185; G01S 5/02
[52] U.S. Cl. ...................................... 342/353; 342/357
[58] Field of Search ................................ 342/357, 353

[56] References Cited

U.S. PATENT DOCUMENTS

| | | | |
|---|---|---|---|
| 2,746,034 | 5/1956 | Hasbrook | 342/125 |
| 2,972,742 | 2/1961 | Ross | 342/451 |
| 3,047,861 | 7/1962 | Arnold | 342/456 |
| 3,209,357 | 9/1965 | Wyatt | 342/357 |
| 3,384,891 | 5/1968 | Anderson | 342/357 |
| 3,430,234 | 2/1969 | Wright | 342/46 |
| 3,495,260 | 2/1970 | Laughlin | 342/456 |
| 3,497,807 | 2/1970 | Newton | 455/13 |
| 3,534,367 | 10/1970 | Laughlin et al. | 342/456 |
| 3,544,995 | 12/1970 | Bottenberg et al. | 342/46 |
| 3,611,379 | 10/1971 | Deckett | 342/125 |
| 3,624,650 | 11/1971 | Horttor et al. | 342/145 |
| 3,668,403 | 6/1972 | Mellander | 364/440 |
| 3,742,495 | 6/1973 | Diamantides | 342/64 |
| 3,742,498 | 6/1973 | Dunn | 342/88 |
| 3,750,166 | 7/1973 | Dearth | 342/30 |
| 3,766,552 | 10/1973 | Hajduk | 342/37 |
| 3,810,179 | 5/1974 | Merrick | 342/46 |
| 3,836,970 | 9/1974 | Reitzig | 342/352 |
| 3,886,553 | 5/1975 | Bates | 342/465 |
| 3,889,122 | 6/1975 | Black | 73/382 |
| 3,918,056 | 11/1975 | Merrick | 342/46 |
| 3,988,734 | 10/1976 | Elwood | 342/464 |
| 4,042,923 | 8/1977 | Merrick | 342/42 |
| 4,161,730 | 7/1979 | Anderson | 342/52 |
| 4,170,776 | 10/1979 | MacDoran | 342/458 |
| 4,179,693 | 12/1979 | Evans | 342/64 |
| 4,224,669 | 9/1980 | Brame | 364/433 |
| 4,253,098 | 2/1981 | Blythe | 342/25 |
| 4,292,634 | 9/1981 | Wu | 342/25 |
| 4,359,733 | 11/1982 | O'Neill | 342/36 |
| 4,386,355 | 5/1983 | Drew | 342/357 |
| 4,387,373 | 6/1983 | Longuemare, Jr. | 342/25 |
| 4,445,120 | 4/1984 | Rosenthal | 342/462 |
| 4,472,720 | 9/1984 | Reesor | 342/388 |
| 4,744,083 | 5/1988 | O'Neill | 37.1/5.1 |
| 4,839,656 | 6/1989 | O'Neill | 342/357 |

Primary Examiner—Gregory C. Issing
Attorney, Agent, or Firm—Russell B. Miller

[57] ABSTRACT

A method and system for determining the position of an object using a fixed station and a plurality of earth orbit satellites whose positions are known. Separate periodic signals are transmitted from the fixed station via first and second satellites to the object whose postion is to be determined. The phase offset in periodic characteristics of the periodic signals as received from the first and second satellites is measured at the object. The phase offset corresponds to a relative time difference in propagation of the signals traveling two different paths to the object. The object transmits via the first satellite a return signal indicative of the measured relative time difference. This return signal is activated some time in the future according to the object local time, which is slaved to receipt of the periodic signal sent through the first satellite. This future time is the start of the particular time period as decided by the fixed station's schedule. At the fixed station, an instantaneous round trip delay, determined by the time offset of the current transmission clock time relative to the receive clock time of reception of the return signal, along with the measured relative time difference sent back on the return signal, is used to calculate the distances between the first and second satellites to the object. From these distances the position of the object is calculated.

25 Claims, 4 Drawing Sheets

DUAL SATELLITE NAVIGATION SYSTEM

TECHNICAL FIELD

This invention relates to object position determination using satellites. More specifically, this invention relates to a novel and improved method for mobile vehicle position determination using signal propagation time delays through a plurality of communication paths to calculate the vehicle position.

BACKGROUND ART

A need is recognized by many in the mobile vehicle environment for vehicle location information. One industry in particular in which such information is particularly desirable is the commercial trucking industry. In the commercial trucking industry an efficient and accurate method of vehicle position determination is in demand. With ready access to vehicle location information, the trucking company home base obtains several advantages. The trucking company can keep the customer apprised of location, route and estimated time arrival of payloads. The trucking company can also use vehicle location information together with empirical data on the effectiveness of routing, thereby determining the most economically efficient routing paths and procedures.

Heretofore, vehicle location information has been communicated to the trucking company home base by the truck drivers themselves, via telephones, as they reach destinations and stopovers. These location reports are intermittent at best, because they only occur when the truck driver has reached the destination or stopover and can take the time to phone the trucking company home base. These location reports are also quite costly to the trucking company because in effect they cause substantial down time of the freight carrying vehicle. This down time is due to the fact that to make a location report, the tractor driver must remove his vehicle from route, find a telephone which he can use to phone the home base, and take the time to make the location report. This method of location report also leaves room for substantial inaccuracies. For example, truck drivers may report incorrect location information either mistakenly or intentionally; or report inaccurate estimates of times of arrival and departure.

Presently the commercial trucking industry is implementing versatile mobile communication terminals for use in their freight hauling tractors. These terminals are capable of providing two-way communications between the trucking company home base and the truck. Typically the communications are via satellite between the truck and a network communications center or hub. The trucking company is coupled by conventional means, such as telephone lines to the hub.

Using the radio communication capabilities at each mobile terminal to provide vehicle position determination offers great advantages to the commercial trucking industry. Location reports would no longer be intermittent because the trucking company home base could locate a vehicle at will. No down time of the freight hauling vehicle would be required because the communications necessary for determining location could take place while the truck is in route. Also, inaccuracies in location reports would be virtually eliminated because the trucking company home base would be almost instantaneously ascertaining accurate vehicle location information.

Heretofore, methods of object position determination have been relatively inaccurate or required expensive dedicated hardware. One such method is as described in U.S. Pat. No. 4,161,730. This method offers position estimation with occasional accurate position updates. The accuracy of the position estimation is dependent upon the accuracy of a dedicated clock of $10^{-10}$ located at the object whose position is being determined. It also proposes the use of accurate, space qualified, atomic clock standards aboard the satellites such as GOES satellites.

Another well known method of position determination is made by using a conventional LORAN-C system. In this application each mobile unit includes a LORAN-C unit which typically includes an antenna and position sensor/processor. The LORAN-C signals are received at the mobile unit where they are processed. The resulting position determination may then be transmitted to the fixed station.

It is therefore an object of the present invention to provide a novel and improved method for object location as an adjunct to a satellite communication system.

It is another object of the present invention to provide a novel and improved method of object position determination whose accuracy does not require independent and highly precise time keeping equipment located either in the satellites of the system or the object whose position is being determined.

It is a further object of the present invention to introduce a new approach for determining time intervals (hence distance) without maintenance of an absolute time base at the vehicle, contrary to methods as prescribed in U.S. Pat. No. 4,161,730.

It is still a further object of the present invention to introduce the use of standard transponder satellite payloads for the purposes of vehicle position determinations. These communication transponders, which are used in the majority of communications satellites, are adequate for relaying the signals used for position determination of the vehicle. Special time and frequency standards within the satellite are not required. It is only necessary to know their characteristics.

It is a further object of the present invention to provide a novel and improved method of vehicle location which does not require vehicle down time.

It is yet another object of the present invention to provide a novel and improved method of vehicle location determination which allows the trucking company home base to determine vehicle location at will rather than relying on intermittent reports from a truck driver.

SUMMARY OF THE INVENTION

The present invention is a method of object position determination which relies upon the theory of trilateration. Trilateration prescribes that if the position of three objects are known relative to each other, and the distance from each of these three objects to a fourth object is known, then the three dimensional position of the fourth object can be determined within the coordinate frame which described the location of the first three objects.

The present invention employs trilateration by first assigning one of the three fixed object locations to the center of the earth. Because the object whose position is to be determined, typically a vehicle, is known to travel upon the surface of the earth, standard geodetic planetary models are available to define the distance from the earth's center to any latitude and longitude location on the surface. The second and third object locations are given by two earth orbiting, repeater satellites, whose positions in earth coordinates, if not known are then ascertained. The distance from each of these satellites to the object whose position is to be determined is then ascertained. Once the distance from each respective satellite to the object is known, and given the distance from the object to the center of the earth, i.e the radius of the earth, the three dimensional position of the object is determined and translated onto the latitude and longitude lines of the earth.

The method of the present invention can be used to initially determine the positions of the two earth orbiting satellites within the earth coordinate frame using trilateration. As discussed, these satellites can be located in earth coordinates if t he distance from the satellites to three fixed positions is known. These three fixed positions are three fixed observing sites positioned upon the surface of the earth, whose positions are known precisely in earth coordinates, and have identical communications means as do the vehicles. The distances from the satellites to these fixed observing sites are determined by ascertaining propagation times of the radio signals transmitted to and from these stations via the satellites. From these propagation times, the distance over which those signals have transversed can be computed. Once these distances are determined, the respective satellites positions, in earth coordinates, may be calculated.

The method of the present invention is used primarily to determine the position of an object on the surface of the earth. In application of this aspect of the invention, the distance from each of the two satellites to the object position is determined. Again, distances are computed based upon radio signal propagation times over which that signal has traversed.

More specifically, a fixed ground station continuously transmits two radio signals, each with an identical periodic carrier modulation, via each of the satellites to the object being located. The object is typically a mobile unit or vehicle having a communications terminal. The fixed ground station signals, as transmitted to the object, are referred to herein as forward signals. The object continuously receives these periodic forward signals and measures the percent of periodic phase offset between the two carrier waveforms. The difference in phase between these two carrier waveforms is due to one of the signals traveling a longer path length via one satellite than the other. The object transmits a return signal, after some arbitrary delay in which the amount the delay is not important nor required to be known, containing the percent offset information. The return signal is transmitted upon the same path as the forward signal from the first satellite, back to the fixed ground station.

In monitoring the received carrier periodic signal through the first satellite, the object performs functions that slave the clock standard of the object to the reception of the periodic signal. Thus the object clock standard is offset in time from the fixed ground station transmitted signal on account of the signal propagation delay. The object is then allowed to transmit the observed percent offset between the two forward signals, starting at some specific period in the future. The fixed ground station then receives the return signal back through the first satellite whenever it comes back, but realizes the receipt of a message starting with that specific period identification number, or frame, has arrived later than the current period being sent out on the forward carriers. The amount of this late arrival is interpreted as the instantaneous round trip delay of signals traveling a path from the fixed ground station to the object and back, through the first satellite.

The forward signal propagation delay changes as the object changes position. However, since the object clock standard is slaved to the received forward signal, the object clock standard changes as does the propagation delay. Therefore, position determination functions to be performed by the object at some arbitrary time in the future are not hampered even though the object has moved since the request was sent to the object. The object merely needs to make a timely measurement of the offset in the two periodic forward signals just prior to transmitting to the fixed ground station the corresponding data. The round trip propagation delay is thus a function of the current propagation delay and the phase offset between the two periodic signals.

It should be noted that there is no activity of marking elapsed time through the use of time tags as proposed in other inventions. The forward signal is not marked by any operation at the fixed ground station just prior to transmission as it leaves the fixed ground station; nor when it arrives at the object; nor just prior to transmission of a return signal by the object. The phase offset between the two forward signals as received by the object is also not marked against any known absolute time reference or clock, since it is only determined against the object local clock which is continuously slaved to the motion of the vehicle, and the motion of the satellite in space. The fixed station only makes comparisons of an agile fixed ground station reception clock time against the current, fixed ground station transmission clock time to produce the round trip delay.

Given this round trip delay, the known velocity of propagation of the radio signal and the known distance from the fixed station to the first satellite, the distance from the first satellite to the object is calculated. The distance from the object to the second satellite is calculated from the percent difference in forward signal phase offset at the object, the round trip delay through the first satellite, the known velocity of propagation of the radio signal and the distance from the second satellite to the fixed station. Thus, the method of the present invention determines the distance from each of the satellites to the object whose position is to be determined.

With the positions of the satellites known relative to the center of the earth, and the distances from the respective satellites to the object whose position is to be determined are known, trilateration may be employed to determine the position of the object relative to the center of the earth and the satellites.

In the present invention, a mobile communications terminal serves as the receiver and transmitter of the object whose position is to be determined. A fixed ground station is in communications with the mobile communications terminal via a primary satellite. The trucking company home base is capable of communicating with the ground station to complete communications with the mobile communications terminal. Typically it is the trucking company home base that initiates a vehicle position determination. However, the mobile communications terminal itself may initiate a position determination. One such case is when a trailer is detached from the tractor. This trailer detachment location may then be communicated to the trucking company home base. Given such an embodiment, at will determination of the location of a vehicle can be accurately and instantly determined without requiring down time of the freight hauling vehicle.

The present invention provides for earth vehicle position determination from values derived from signal propagation delays. Values corresponding to a round trip propagation of a signal communicated through a transponder of a first satellite and a propagation delay difference of one way signals communicated through the first satellite transponder and transponder of a second satellite are generated and used in computing vehicle position.

The round trip delay is computed implicitly by comparison of the current time of the fixed station transmission clock with the time of the fixed station reception clock upon receipt of the relevant return path transmissions from the vehicle. The vehicle local time clock is slaved directly to the reception of a forward link transmission from the fixed station and thus includes an inherent propagation delay with respect to the current time at the fixed station transmission clock. The vehicle return transmissions are transmitted according to normal communication methods of TDMA assignments on the return channels. At the fixed station the return clock is allowed to dynamically adjust in real time to demodulate with highest probability any return link transmission from many vehicle communication transmissions.

With respect to the propagation delay difference between the one way communicated signals there is no absolute time markings of any kind required nor reported to determine the time differentiation between the arriving signals. The time differential is computed as a function of phase offset in periodic modulation of the received signals.

It is a further aspect of the invention that the location of different vehicles in different user groups may be determined. Various arrangements of primary and secondary satellite transponders can be utilized to facilitate communication and location of vehicles in differing user groups. In all applications the use of two satellites facilitate a round trip signal propagation value and a propagation time differential value to be generated. From these values and other known position and distance values, vehicle position can be determined.

BRIEF DESCRIPTION OF THE DRAWINGS

The features and advantages of the present invention will become readily apparent from the detailed descriptions of the drawings set forth below when taken in conjunction with the drawings, in which like reference characters correspond throughout and wherein.

DETAILED DESCRIPTION OF THE PREFERRED EMBODIMENTS

Figure 1:
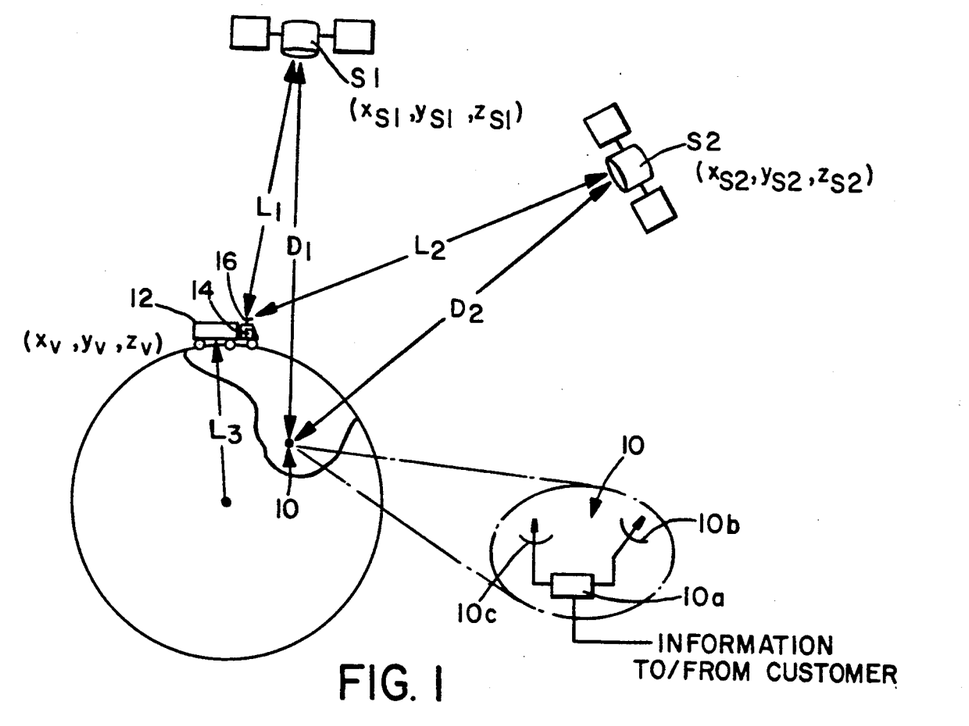
FIG. 1 is an illustration of an exemplary embodiment of the trilateration method of the present invention in which the major components used for object location are identified.

The method of object position determination of the present invention is best illustrated in the context of the location of a land based mobile unit typically a vehicle in the commercial trucking industry. The components required for mobile unit location are depicted in FIG. 1. A hub or fixed ground station 10 in FIG. 1 includes a communications terminal 10a which is capable of satellite communications. Terminal 10a typically includes a transceiver, an interface to the customer home base and a processor each (not shown).

Fixed station 10 also includes primary antenna 10b and secondary antenna 10c. Primary antenna 10b is in line of sight with primary satellite S1 and is capable of tracking satellite S1. Transmissions on primary antenna 10b typically contain digital information modulated on a signal carrier. The signal carrier is characterized as an RF signal with sawtooth periodic frequency modulation. Secondary antenna 10c is in line of sight with secondary satellite S2 and is capable of tracking satellite S2. Transmissions on secondary antenna 10c typically consist of the signal carrier lacking the digital information modulation although the sawtooth periodic modulation remains.

Primary satellite S1 is an earth orbiting satellite carrying a standard transponder payload and is positioned in geosynchronous orbit above the earth in line of sight of both fixed station 10 and the object to be located, object 12. The secondary satellite S2 is also an earth orbiting satellite carrying a standard transponder payload and is positioned in geosynchronous orbit above the earth in line of sight of fixed station 10 and object 12. It is preferred that satellites S1 and S2 have an angular separation in the range of 8°–24° although angles as low as 3° and as high as 70° are possible.

In this case the object is a mobile unit. Mobile unit 12 is a typical commercial trucking vehicle having a mobile communications terminal 14 mounted in the tractor or cab of the vehicle. Mobile communications terminal 14 includes antenna 16 and is capable of tracking satellites S1 and S2. Mobile communications terminal 14 is capable of respectively transmitting and receiving communication signals to and from satellite S1, while only receiving signals from satellite S2.

The primary function of the method of the present invention is determining the position of a vehicle. This is accomplished by solving a set of non-linear equations. These equations contain the unknown vehicle position components, in cartesian x-y-z coordinates, on one side of the equation set, and observed (or measured) distance values on the other side. Each of the lengths L1, L2 and L3 are defined according to a distance function. Hence, the model for each length is the sum of the squares of differences in the three cartesian components, x-y-z, where:

$$L1 = [(xS1-xV)^2 + (yS1-yV)^2 + (zS1-zV)^2]^{\frac{1}{2}}, \qquad (1)$$

$$L2 = [(xS2-xV)^2 + (yS2-yV)^2 + (zS2-zV)^2]^{\frac{1}{2}}, \text{ and} \qquad (2)$$

$$L3 = [(xV)^2 + (yV)^2 + (zV)^2]^{\frac{1}{2}}. \qquad (3)$$

The method of the present invention provides for the measuring of the satellite cartesian coordinates xS-yS-zS. Hence, the three unknowns, xV-yV-zV on the right hand side, are expressed in three unique ways by three expressions. On the left, three actual values are assigned to these expressions. The left side distance values (except L3) are obtained through a measuring process as defined herein as a part of the method of the present invention. The distance value L3 is simply assigned the value of the earth's radius, i.e., from the earth's center to the vehicle position which is approximately 6,378,137 meters. However, a more complex method may be used to define L3 according to the shape of an ellipse of revolution, which uses an equatorial radius of 6,378,137 meters and a polar radius of 6,356,752 meters. Accordingly, equations (1-3) expressed above are satisfied through an iterative process that converges onto the correct cartesian coordinates of the vehicle.

Although the primary function of the present invention is locating the vehicle, a reliable means of supporting that function with current satellite positions is necessary. Satellite position information may be obtained from satellite controllers. However, more current information on satellite position may be obtained through a reverse process of trilaterating the satellites from a plurality of fixed observing sites whose cartesian x-y-z coordinates are known. The process of determining satellite position is described later herein with reference to FIGS. 3 and 4.

Figure 2:
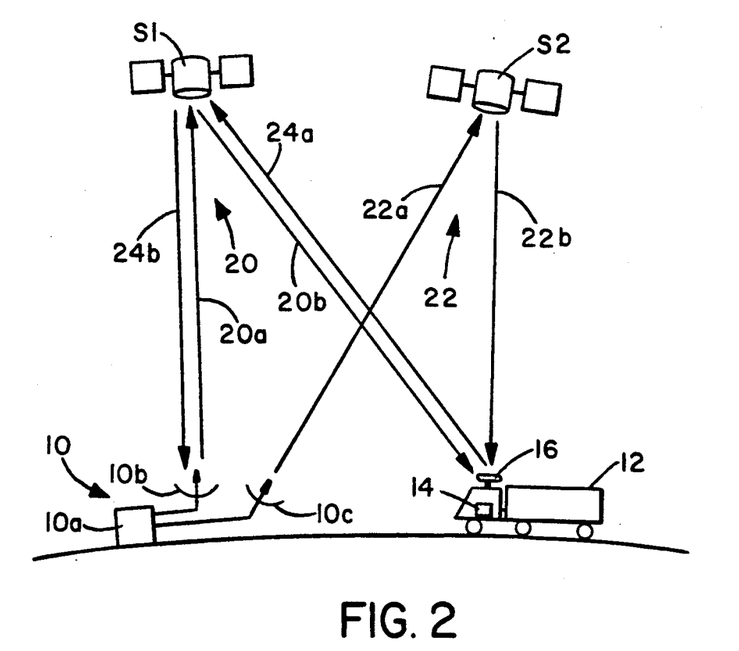
FIG. 2 is an illustration of the components and signal paths used in the method of the present invention to determine the distance between satellites and the object whose position is to be determined.

Determination of the distance between the satellites and the vehicle whose position is to be determined is accomplished by translating radio signal propagation times into distance through which that signal has traversed. As shown in FIG. 2, forward signals are transmitted from station 10, at antennas 10b and 10c, via primary satellite S1 and secondary satellite S2 respectively to mobile unit 12. The signal transmitted from antenna 10b via satellite S1 to mobile unit 12 is identified as the forward link signal 20 with the uplink and downlink portions thereof being respectively identified by the reference numerals 20a and 20b. The signal transmitted from antenna 10c via satellite S2 to mobile unit 12 is identified as the forward link signal 22 with the uplink and downlink portions thereof being respectively identified by the reference numerals 22a and 22b. The signal carrier waveforms of forward link signals 20 and 22 are identical and synchronized when generated for transmission. A forward link clock is used in generating the periodic sawtooth frequency modulation carrier of the forward link signals. When forward link signal 22 is used only for ranging purposes, the satellite transponder through which this signal is relayed may be operated at a significantly lower power. For example, the transponder power level may be only 10% of a 10 KW transponder to support an unmodulated carrier and still provide an adequate ranging signal.

Figure 5:
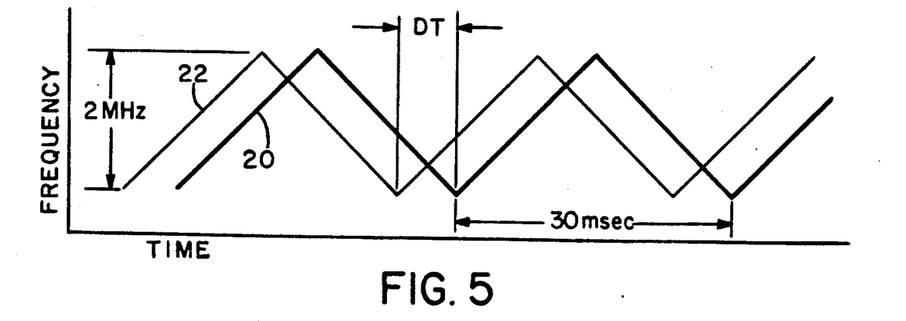
FIG. 5 is an exemplary illustration of the waveform of the first and second forward carrier signals as they may be received at the object whose position is to be determined, or other fixed communication terminals used for 28 satellite location purposes.

At mobile unit 12, mobile communications terminal 14 receives upon antenna 16 forward link signals 20 and 22. The periodic modulation for both these signals is shown in FIG. 5. Mobile communications terminal 14 measures the percent phase offset, with respect to the forward link signal period, in the sawtooth periodic modulation of the carrier signals arriving from the two forward link signals 20 and 22. Phase offset can be measured using either independent match filtering on both signals and comparing time differentials between them, or mixing the two signals together and deriving the time differential from the phase of the resulting signal.

The measured percent phase offset will be interpreted as a time difference, DT, of absolute times, T2 and T1 which are not available at mobile unit 12 since the time base within mobile unit 12 is slaved to receiving the periodic modulation via satellite S1 and is subject to location of the vehicle on the earth and/or to the satellite motion about its nominal location in space. However, the percent offset does correspond to a true time difference, DT, and is defined for mathematical purposes as a difference in absolute times even though T2 and T1 are not known:

$$DT = T2 - T1. \qquad (4)$$

Mobile communications terminal 14 is capable of transmitting a return link signal 24 via primary satellite S1 to fixed station 10. Return link signal 24 is comprised of uplink and downlink signal portions identified respectively by the reference numerals 24a and 24b.

In mobile unit 12, specialized algorithms are utilized by mobile communications terminal 14 for acquiring and tracking satellite relayed signals. These algorithms are used to sequentially acquire and track the periodic modulation of the satellite forward link signals to permit phase offset measurements to be made. Typically the mobile unit directional antenna is tracking the primary satellite signal, but to make the phase offset measurement the antenna is rotated in azimuth to locate the secondary satellite signal. Mobile communications terminal 14 frequency plan and match filter time is adjusted to receive the forward link signal transmitted through the secondary satellite. Once the secondary satellite signal is acquired and tracked precisely, the antenna is rotated back in azimuth for acquisition and tracking of the primary satellite relayed signal at which time the mobile unit measures the phase offset.

Return link signal 24 carries information including information indicative of the time difference between forward link signals 20 and 22 at mobile unit 12, i.e. DT. The time difference DT, is monitored and noted at mobile unit 12 immediately prior to transmission of return link signal 24.

Upon reception of return signal 24 at fixed station 10, communications terminal 10a measures the required clock offset in the return link hardware to receive the return transmission and successfully demodulate its information. This clock offset of the return link clock relative to the forward link clock, the forward link clock used in generating the sawtooth periodic modulation shown in FIG. 5, is marked as the instantaneous RTD (round trip delay). This RTD corresponds to the instantaneous round trip time (or distance) for a signal transmitted from fixed station 10 via primary satellite S1 mobile unit 12, and instantly retransmitted from mobile unit 12 via primary satellite S1 to fixed station 10, where:

$$RTD = \text{Hub Forward Clock} - \text{Hub Receive Clock}. \qquad (5)$$

The reference clock of mobile unit 12 is slaved to the received forward link periodic carrier waveform. Since the forward link signal undergoes a propagation delay between transmission and reception, the reference clock of mobile unit 12 is delayed with respect to the transmitted forward link periodic carrier by this propagation delay.

In the communications between fixed station 10 and mobile unit 12, the periodic carrier waveform transmitted by fixed station 10 contains information. Mobile unit 12 thus synchronizes its timing to the received signal to demodulate this information from the carrier.

Information communicated between fixed station 10 and mobile unit 12 are transmitted in time frames in a Time Division Multiple Access (TDMA) format as is known in the art. Such a communication system is disclosed in U.S. patent application Ser. No. 07/145,176 filed Jan. 19, 1988, entitled "ALTERNATING SEQUENTIAL HALF DUPLEX COMMUNICATION SYSTEM", now U.S. Pat. No. 4,979,170, issued Dec. 18, 1990 and assigned to the Assignee of the present invention. Thus fixed station 10 may command mobile unit 12 to immediately initiate position determination steps or at some future time. Whenever mobile unit 12 reference clock is in synchronization with the received forward link periodic carrier waveform, valid position determination steps can be executed.

Figure 6:
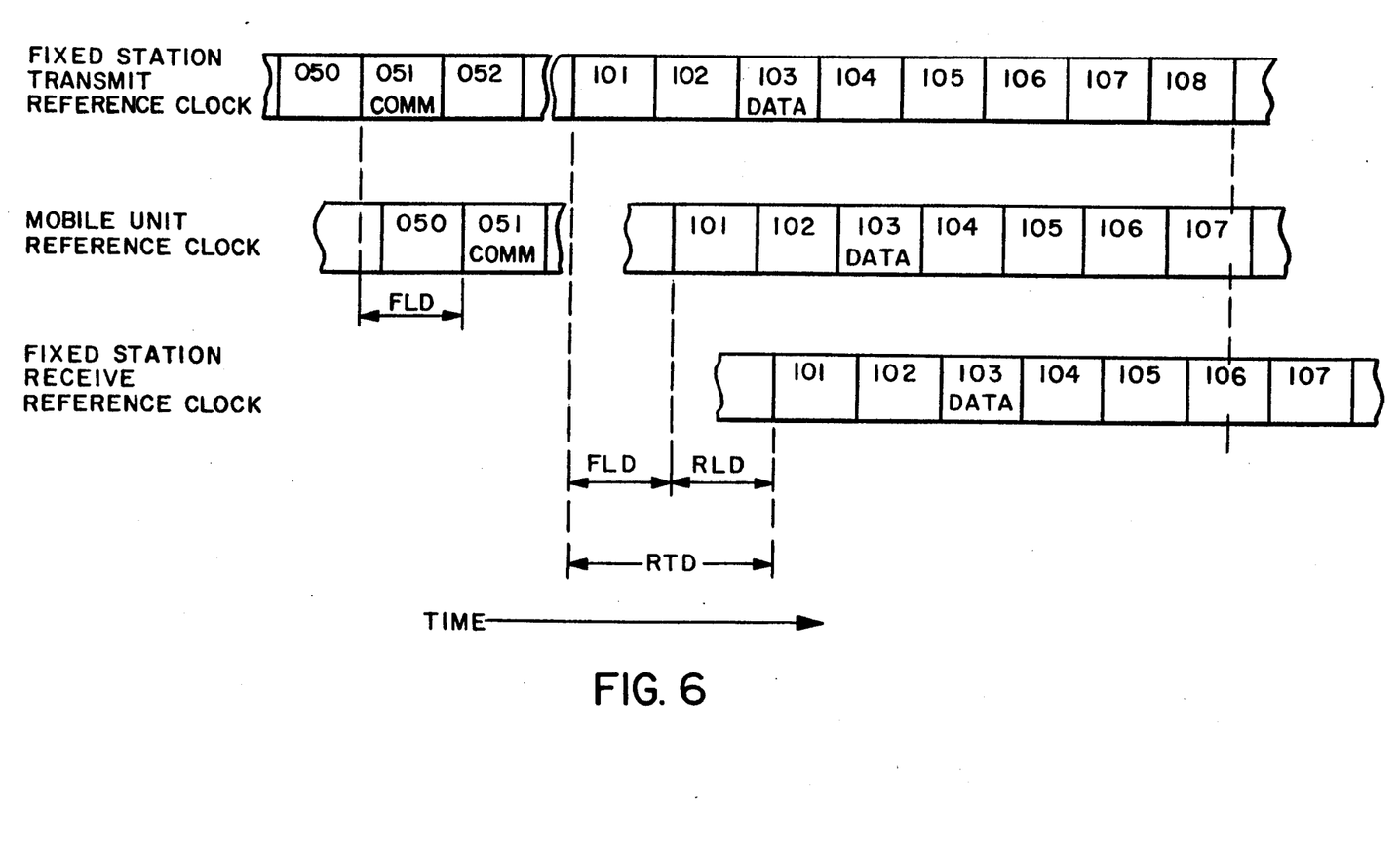
FIG. 6 is a graph illustrating the fixed ground station time references and mobile unit time reference.

FIG. 6 illustrates in graphical form the relative reference clock offsets at fixed station 1 and mobile unit 12. Fixed station 10 transmits data in frames with the transmit reference clock timing frames illustrated in the top frame line. One or more frames, for example frame 051, contains a command that is sent to mobile unit 12 to begin transmitting data corresponding to the time difference DT to fixed station 10 at a certain frame, for example frame 103. Using the timing of the fixed station transmit reference clock, fixed station 10 would expect to receive mobile unit 12 transmitted data in frame 103, absent any propagation delays, with interpretation of the data as a return during the frame.

Mobile unit 12 receives the command at frame 051 which as received is delayed in time with respect to the fixed station transmit reference by the forward link propagation delay FLD. At the mobile unit, the command is interpreted with the time difference DT being determined just prior to transmission of this data in frame 103. At the beginning of frame 103 at mobile unit 12 the data is transmitted back to fixed station 10. The delay in transmission with respect to the transmit reference clock of fixed station 10 is equal to the FLD.

The return link signal in the preferred embodiment is a spread spectrum modulated signal. The spread spectrum modulation has a minimum pseudorandom (PN) chip rate modulation of 1 MHz. A short period, pseudorandom, maximal length code, period 63, is used for quick detection of the return link signal preamble. The remaining message transmission is modulated with each length-63 period modulated with an additional pseudorandom, maximal length sequence with period 31. Combining the 63-length sequence with 31-length overlay sequence produces a period of length 1953 chips long. This length in microseconds allows for an unambiguous alignment of the return link signal demodulator hop edge to less than 10% of a spread spectrum chip and thus precise measurement of the round trip delay on the order of 0.1 microseconds.

The signal transmitted from mobile unit 12 to fixed station 10 also undergoes a return link propagation delay RLD. The RLD is equal to the FLD, with slight corrections, since the signals traverse the same path. The receive clock of fixed station 10 is offset in timing with respect to the transmit reference clock to account for propagation delays. This offset in timing is a round trip delay RTD which equals the FLD added to the RLD. Fixed station 10 receive clock timing is offset in order to properly demodulate frame data.

Fixed station 10 receives in frame 103, according to the receive reference clock timing, mobile unit 12 transmitted DT data. Several bits of information are collected as frames are demodulated and tracked by the fixed station receiving equipment. Within several frames from the beginning of frame 103 of the fixed station receive reference clock timing, a decision is made that tracking is settled and a determination of RTD is made and recorded at the fixed station 10. In the example illustrated in FIG. 6, tracking is settled at during frame 105 of the fixed station receive reference clock timing. A determination of propagation delay is then made by comparing the receive reference clock with the current transmit reference clock. In this example, the transmit reference clock is ending frame 107 and beginning frame 108 when the RTD is interpreted against the receive clock in the middle of frame 105. This 2½ frame offset is readily computed into a RTD since each frame is a known quantity of time.

Dividing round trip propagation time value RTD in half yields a value FL1 which corresponds to the propagation time of forward link signal 20, i.e.

$$FL1 = RTD/2. \quad (6)$$

Adding the value DT which corresponds to the time difference of forward link signal 20 and 22 at mobile unit 12, to the value FL1 corresponding to the propagation time of forward link signal 20 yields a value FL2 which corresponds to a derived propagation time of forward link signal 22, i.e.

$$FL2 = FL1 + DT. \quad (7)$$

The values FL1 and FL2, corresponding to the propagation times of forward link signals 20 and 22, are then multiplied by the value corresponding to the propagation velocity of an electromagnetic signal in free space. This multiplication process yields the propagation distance of forward link signals 20 and 22 respectively. FL1 and FL2 are then used to determine single leg distances between satellites S1 and S2 toward the mobile unit 12.

The present invention provides for the measuring of the distances from fixed station 10 to the satellites or using distance values obtained from satellite control operations. The distances from fixed station 10 to satellites S1 and S2 are respectively identified by the distance values D1 and D2. The distances from satellites S1 and S2 to mobile unit 12 are respectively identified by the distance values L1 and L2. The distance values L1 and L2 are calculated by subtracting the distance values D1 and D2 from the signal propagation paths 20 and 22 respectively. In summary, the distances may be computed from the following equations:

$$L1 = (FL1)^*c - D1 = (RTD/2)^*c - D1 \text{ and} \quad (8)$$

$$L2 = (FL2)^*c - D2 = ((RTD/2) + DT))^*c - D2 \qquad (9)$$

where c is the speed of light in free space. Thus, the distances from two known positions, i.e. those of primary satellite S1 and secondary satellite S2, to the mobile unit whose position is being determined are measured by the method of the present invention. Utilizing the teachings of the present invention it is possible to obtain vehicle location accuracy within one mile of actual location given certain accuracies of measurement of RTD and DT plus assuming certain modeling accuracy of the earth's surface for L3.

Given measured distances L1 and L2, the known radius of the earth and the x-y-z coordinates of satellites S1 and S1, trilateration is employed to determine the x-y-z coordinates of the mobile unit relative to the cartesian x-y-z coordinate system with an origin located at the center of the earth. Solving equations 1-3, the position of the mobile unit is revealed.

Although the primary function of the present invention is locating the mobile units, a reliable means of supporting that function with current satellite positions accurate to about 30 meters is necessary. Obtaining a satellite ephemeris report from satellite owners implies a delayed version of what the satellite was doing weeks ago, and therefore may lack the required accuracy at current time. Rather than obtain such a report from satellite controllers, satellite position can be obtained in real time through the reverse process of trilaterating each satellite position from fixed observing sites using the same RTD and DT values described previously.

To employ trilateration in the manner presented herein, the cartesian x-y-z coordinate system is most conveniently referenced relative to the center of the earth. The positions of primary and secondary satellites are determined in much the same manner as the position of the mobile unit. In essence, the distance from these satellites to at least three geometrically diverse but known positions are measured to yield the positions of the satellites. Located at the three geometrically diverse sites are fixed communications terminals whose positions are known accurately in the earth-fixed coordinate frame. The distance from each of these sites to each of the satellites is measured by the same means of RTD and DT combinations with the additional requirement of one of the fixed communications terminals being collocated with Hub station 10 so that the common link distance between station 10 and each satellite can be removed from the forward link distance to each of the other fixed observation sites.

It is noted that the velocity of the satellite must also be estimated so that satellite position may be extrapolated accurately to any arbitrary time point, especially future time points. Without accurate extrapolation, the performance of the mobile unit navigation function suffers. The 'best' way, in a minimum variance estimate sense, to perform extrapolations of position from the information contained in the tracking data is to estimate position and velocity simultaneously in a sequential filtering scheme, such as a Kalman filter. Such Kalman filtering techniques are well known in the art.

The Kalman filtering approach has the advantage that tracking data need not occur simultaneously in time and that it can be processed one-at-a-time. When each new observation is available, it can be folded into a new position/velocity estimate which reflects the best current estimate of the satellite from all the data and it is not necessary to wait for three such reports. The filter then has a minimum of 6 states, three position states and three velocity states. By adding three acceleration states to the filter the tracking behavior improves substantially for motion that is in fact, due to an orbit. The filter also tracks non-orbital motions, which will occur when station adjustments are made with the satellite's maneuvering rockets.

Kalman filtering techniques can therefore be used to convert the fixed location RTDs and DTs from fixed tracking sites, into satellite locations in real time using sequential time reports at predetermined intervals from the fixed tracking sites. For example, a first fixed tracking site reports in and is followed a minute later by a next fixed tracking site and so on.

Figure 3:
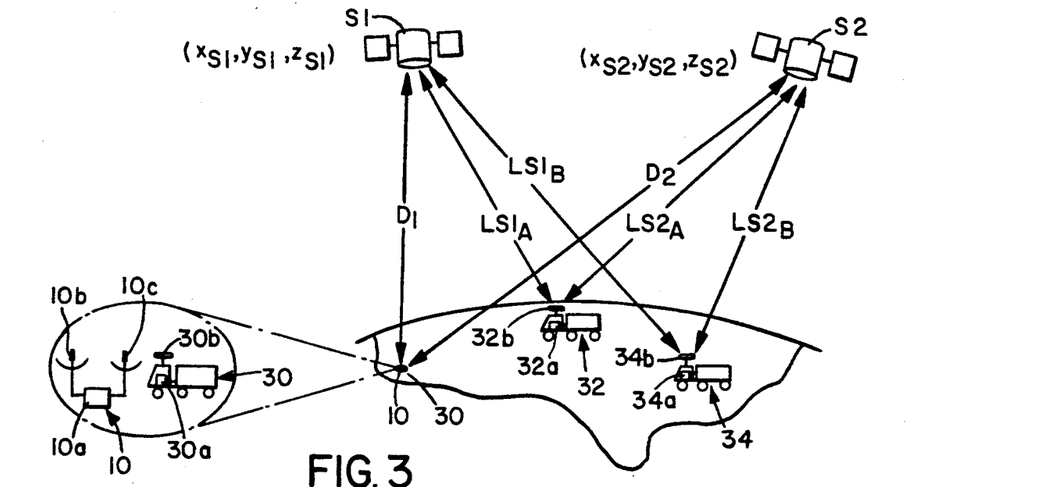
FIG. 3 is an illustration of an exemplary embodiment of the present invention in which the major components used for satellite location are identified.

FIG. 3 depicts the components used in the preferred embodiment of the present invention to determine the position of satellites S1 and S2. FIG. 3 shows three fixed observing sites, fixed station 10 and fixed units 30, 32 and 34 which may be mobile units positioned at known fixed observing sites or locations. Fixed station 10 as discussed previously is comprised of communications terminal 10a, primary antenna 10b and secondary antenna 10c. Fixed mobile unit 30 is comprised of communications terminal or transceiver 30a and antenna 30b. Similarly, fixed mobile units 32 and 34 are respectively comprised of communications terminals or transceivers 32a and 34a, and respectively corresponding antennas 32b and 34b. In the exemplary illustration of FIG. 3, satellite S1 is the first satellite whose position is to be determined. Satellite S1 orbits the earth and at the time of position determination is in line of sight of the fixed observing sites, i.e. fixed station 10 and fixed mobile units 30, 32 and 34.

Figure 4:
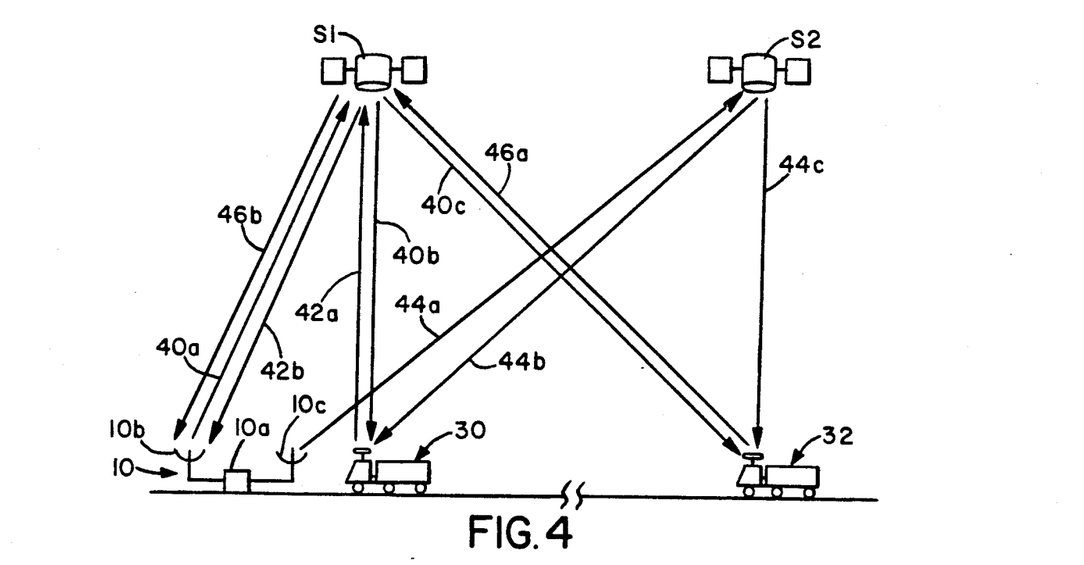
FIG. 4 is an illustration of the components and signal paths used in the method of the present invention to determine the distance between a fixed ground station and the satellites, and between other fixed observing sites and the satellites.

FIG. 4 illustrates the signals used in measuring the distance between fixed station 10 and primary satellite S1. In the preferred embodiment of the present invention one fixed observing site, fixed mobile unit 30, is collocated with fixed station 10. Thus, the distance D1 between fixed station 10 and satellite S1 is the same as the distance D1' between mobile unit 30 and satellite S1, i.e.

$$D1 = D1'. \qquad (10)$$

Fixed station 10 transmits from primary antenna 10b a forward link timing signal 40, comprised of uplink portion 40a and downlink portions 40b and 40c. Forward link signal 40 is transmitted from antenna 10b (uplink portion 40a) via primary satellite S1 to fixed mobile unit 30 located at the fixed observing site immediately adjacent fixed station 10 (downlink portion 40b). Forward link signal 40 is also transmitted by antenna 10b via satellite S1 to fixed mobile unit 32, uplink portion 40a and downlink portion 40c.

Upon reception of this forward link signal 40 at fixed mobile unit 30, fixed mobile unit 30 transmits a return link signal 42, comprised of uplink portion 42a and downlink portion 42b, via primary satellite S1 to fixed station 10. At fixed station 10 the RTD due to the signal path combination of 40 and 42 is measured. The resulting RTD value is divided by four to yield the propagation time of a radio signal traversing a path from fixed station 10 to primary satellite S1. Furthermore the round trip propagation time value RTD divided in half results in the value which is indicative of FLS1, the elapsed time for a signal traveling one way between fixed station 10 and fixed mobile unit 30 via satellite S1. Multiplying the one-way trip propagation time value (RTD/4) by the velocity of propagation of a radio signal in free space, the constant c, yields a distance value D1. The distance value D1 is the distance between fixed station 10 and satellite S1 and can be expressed as follows:

$$D1 = (RTD/4)*c = (FLS\frac{1}{2})*c. \quad (11)$$

FIG. 4 further illustrates the signals used in measuring the distance between fixed station 10 and secondary satellite S2. Transmitted at antenna 10c, simultaneously and coordinated with the forward link signal 40 transmitted by fixed station antenna 10b, is a forward link signal 44. Forward link signal 44 is comprised of uplink portion 44a and downlink portions 44b and 44c. Forward link signal 44 is transmitted from antenna 10c (uplink portion 44a) via secondary satellite S2 to fixed mobile unit 30 (downlink portion 44b) collocated with fixed station 10 and remote fixed mobile unit 32 (downlink portion 44c).

Fixed mobile unit 30 measures the percent offset of the sawtooth modulation of forward link signals 40 and 44. Fixed mobile unit 30 then transmits a return link signal 42, comprised of uplink and downlink portions 42a and 42b respectively, via primary satellite S1 to fixed station 10. Return link signal 42 contains information indicative of a value DT corresponding to the time difference in reception between forward link signals 40b and 44b. The value FLS2 corresponding to the forward transmission delay between fixed station 10 and fixed mobile unit 30 through satellite S2 may be computed as follows:

$$FLS2 = FLS1 + DT. \quad (12)$$

From equation 12, a distance value D2 corresponding to the distance from fixed station 10 to satellite S2 may be computed according to the following equation:

$$D2 = (FLS2/2)*c) \quad (13)$$

where c is the velocity of propagation of a radio signal in free space.

FIG. 4 further illustrates the signals used in determining the distance from primary satellite S1 and secondary satellite S2 to other fixed observing sites. This process, as described herein with reference to the distance from satellites S1 and S2 to fixed mobile unit 32, applies to finding the distance from satellites S1 and S2 to all other fixed mobile units, such as fixed mobile unit 34 (FIG. 3).

Fixed station 10 transmits upon antennas 10b and 10c simultaneous and coordinated forward link signals 40 and 44 respectively to fixed mobile unit 30, via primary satellite S1 (uplink portion 40a and downlink portion 40c), and secondary satellite S2 (uplink portion 44a and downlink portion 44c). Fixed mobile unit 32 measures the percent offset of the periodic sawtooth modulation as received from signals 40 and 44. Fixed mobile unit 32 then transmits return link signal 46, comprised of uplink portion 46a and downlink portion 46b, via primary satellite S1 to fixed station 10. Return link signal 46 is encoded with information indicative of the time difference DT, as derived from the percent offset in periodic modulation received.

Fixed station 10 measures the round trip delay, RTD1A of the signal path combinations of 40 and 46 through comparison of return link clock offset relative to the forward link clock. If RTD1A occurs at a different time than when D1 was calculated, an extrapolated value of D1 is used. This extrapolated D1 value is obtained by tracking the time-rate-of-change of D1 in addition to measuring current values of D1 in order to extrapolate future times. Dividing the time value RTD1A in half yields the propagation time value FLS1A of a radio signal traveling from fixed station 10 via primary satellite S1, to fixed mobile unit 32, i.e.

$$FLS1A = RTD1A/2. \quad (14)$$

Thus the time value FLS1 corresponds to the propagation time of signal 40a and 40b.

Multiplying the propagation time value FLS1 by the velocity of propagation of a radio signal through free space, c, yields the distance traveled of signals 40a and 40c. Subtracting from this path length the previously measured distance value D1 yields the distance LS1A which is the distance between satellite S1 and fixed mobile unit 32 where:

$$LS1A = ((RTD1A/2)*c) - D1 = (FLS1A*c) - D1. \quad (15)$$

The distance from secondary satellite S2 to fixed mobile unit 32 is similarly computed. The propagation time FLS2A of a signal traveling from fixed station 10 via secondary satellite S2 is equal to the propagation time value FLS1 plus the time difference value DT, i.e.

$$FLS2 = FLS1 + DT. \quad (16)$$

The propagation time value FLS2A times the velocity of propagation of a radio signal in free space, c, results in the distance traveled of signals 44a and 44c. Subtracting from this path length the previously measured distance value D2 yields the distance LS2A which is the distance between satellite S2 and fixed mobile unit 32. This distance determination process may be expressed as follows:

$$LS2A = (FLS2*c) - D2. \quad (17)$$

It should be noted that D2 may also be an extrapolated value, in similar fashion to the extrapolation used in computing the D1 value for the primary satellite.

Once the distances from primary satellite S1 and secondary satellite S2 to three or more fixed mobile units are determined, i.e. fixed mobile units 30, 32 and 34, the position of the satellite may be determined. Trilateration is employed to obtain the cartesian x-y-z coordinates of primary satellite S1 and secondary satellite S2 relative to the center of the earth. The collection of distances D1 and LS1A through LS1N are used to compute, using Kalman filtering in the trilateration process, the position of primary satellite S1 in the cartesian x-y-z coordinate frame. Similarly, the collection of distances D2 and LS2A through LS2N are used to compute, also using Kalman filtering in the trilateration method, the position of secondary satellite S2 in the cartesian x-y-z coordinate frame.

Several of the procedures described in the method of the present invention require that a unit have a mobile communications terminal that is capable of measuring the percent offset of the periodic modulation between the two simultaneously transmitted and coordinated signals from fixed station 10. This time difference measurement, DT, is achieved by essentially comparing replicas of the waveform to the two signals received at the mobile unit terminal. This is referred to as matched filtering known in the art. A peak detection in energy identifies when a match is made. The amount of phase offset difference in the replica waveform that is required to detect energy from both signals determines the time difference value DT. Furthermore, it is not necessary to use an independent oscillator to generate the replica waveforms according to a precise and absolute time base such as Universal Coordinated Time (UCT). This invention simply requires that the local oscillator hardware be frequency accurate to better than 10 ppm relative to the oscillator in the fixed station 10. Furthermore the software logic within mobile unit 12 performs operations which effectively correct and slave that oscillator to the time base as determined by reception of forward signal 40c from S1. FIG. 5 is an exemplary illustration of timing signals as received at a mobile unit terminal.

The forward signals are identical with respect to signal carrier waveform except for a unique identifier such as the center frequency when originally transmitted from the antennas of the fixed station. Since these signals are synchronized, their waveforms initially overlap. When the signals, for example signals 20 and 22 of FIG. 2, reach the mobile unit, be it in motion or fixed, their waveforms no longer overlap because they have traversed paths of different lengths.

The signal carrier waveform of the signals 20 and 22 as shown in FIG. 5 are as received at a mobile unit. The signal carriers are swept linearly up and down in frequency from a nominal base or center frequency in a chirping manner. The base frequency of signals 20 and 22 may be the same if polarization is used to identify each signal. Alternatively the base frequency for signals 20 and 22 would be different. The base frequency from which the carrier is chirped is about 14 GHz with frequency chirping over a typical 2 MHz bandwidth. These signals emulate video signals for which conventional satellite transponders are configured to operate. Emulation of the video signal reduces interference to terminals which are not tuned to receive such signals. Each linear up/down frequency sweep or frequency chirp period in the preferred embodiment is approximately 30 milliseconds. The use of a triangle chirp waveform on the forward link signal is particularly suited to permit measuring of phase offsets at the object of the forward link signals when relayed through two or more satellites.

In the preferred embodiment of the present invention the difference in time of arrival of signals 20 and 22 can be no greater than 8 milliseconds. Using the chirped carrier, a mobile unit making the DT measurement can thus unambiguously measure the difference in arrival times by measuring the offset of one of the waveforms with respect to the other.

Figure 7:
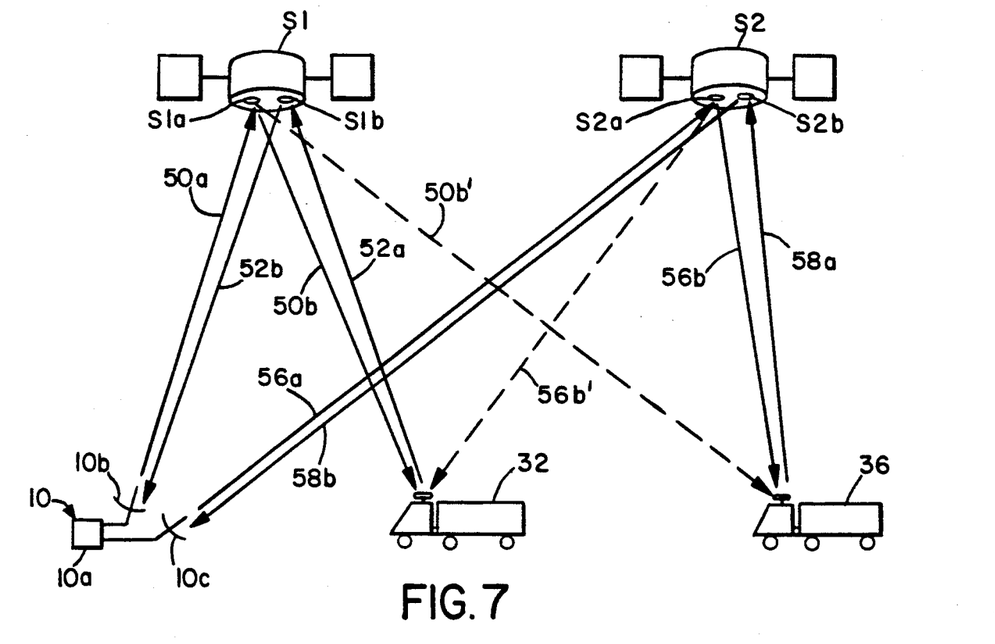
FIG. 7 is an exemplary illustration of a two satellite, four transponder communication and position determination system.

FIG. 7 illustrates one embodiment in communications between fixed station 10 via satellites S1 and S2 to two different groups of users respectively represented by mobile units 32 and 36. Signals transmitted between fixed station 10 and mobile units 32 and 36 via satellites S1 and S2 containing message data modulated upon a carrier signal are illustrated as solid lines. The dashed lines illustrate communication forward link signals for one group of users which are borrowed as ranging signals for the other group of users, and thus serve as replicas of the forward link periodic modulation. The ranging signals are used only for the chirping periodic pattern with the digital information on these signals, intended for another user group, is not demodulated. Satellites S1 and S2 respectively carry a typical transponder payload with each satellite having multiple transponders. In FIG. 7, satellite S1 includes transponders S1a and S1b. Similarly, satellite S2 includes transponders S2a and S2b.

Communications from fixed station 10 to users in a first group, represented by mobile unit 32, is accomplished by transmitting on antenna 10b forward link communication signal comprised of uplink portion 50a and downlink portion 50b. Mobile unit 32 provides a return link communication signal comprised of uplink portion 52a and downlink portion 52b via transponder S1b to antenna 10b. A coordinated ranging signal, which happens to be the forward link communication signal for mobile unit 36, is transmitted from antenna 10c to mobile unit 32 via transponder S2a of satellite S2. The uplink and downlink portions of this ranging signal are respectively identified by the reference numerals 56a and 56b'. This ranging signal along with the techniques previously discussed are used in determining the position of mobile unit 32.

Mobile units in the second user group as represented by mobile unit 36 which also communicate with fixed station 10. Fixed station 10 transmits a forward link communication signal comprised of uplink portion 56a and downlink portion 56b from antenna 10c via transponder S2a of satellite S2 to mobile unit 36. A return link communication signal is comprised of uplink portion 58a and downlink portion 58b which is transmitted from mobile unit 36 via transponder S2b to fixed station 10 where received at antenna 10c. A coordinated ranging signal, which also happens to be the forward link communication signal for mobile unit 32, is transmitted from antenna 10b to mobile unit 36 via transponder S1a of satellite S1. The uplink and downlink portions of this ranging signal are respectively identified by the reference numerals 50a and 50b'. This ranging signal along with the previously discussed techniques are used in determining the position of mobile unit 36.

Figure 8:
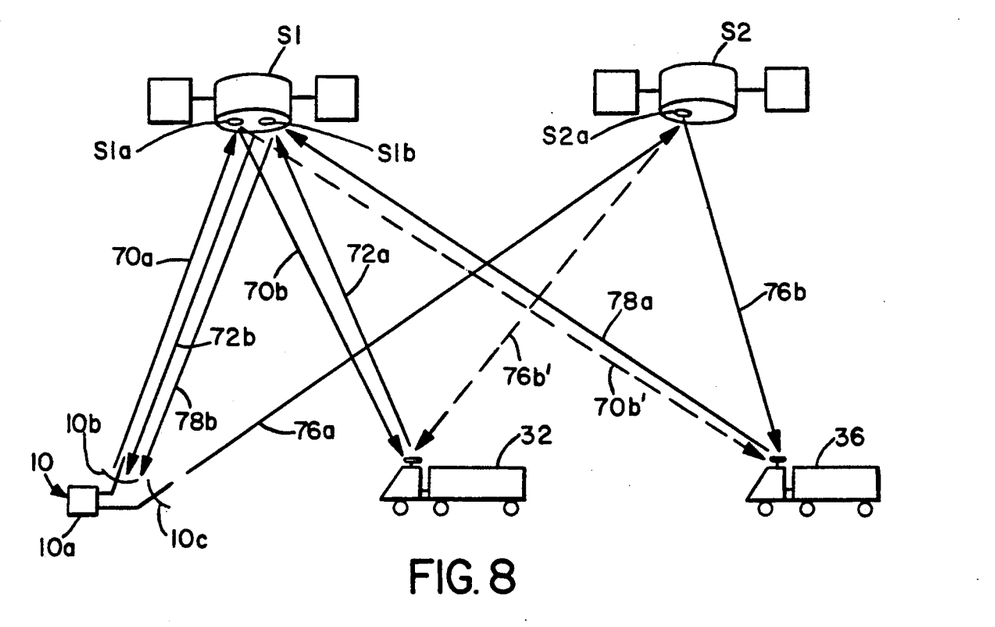
FIG. 8 is an exemplary illustration of a two satellite, three transponder communication and position determination system.

FIG. 8 illustrates an alternate embodiment of the communication system utilizing only three transponders, two transponders on one satellite and one transponder on another satellite. In FIG. 8, fixed station 10 transmits a forward link communication signal comprised of uplink portions 70a and 70b via transponder S1a of satellite S1 to mobile unit 32 of the first user group. A return link communication signal comprised of uplink portion 72a and downlink portion 72b is transmitted from mobile unit 32 to antenna 10b of fixed station 10 via transponder S1b of satellite S1. The ranging signal, which is the forward link communication signal between fixed station 10 and truck 36 comprised of uplink and downlink portions 76a and 76b, is transmitted upon antenna 10c. This ranging signal, comprised of uplink portion 76a and downlink portion 76b, is relayed to mobile unit 32 via transponder S2a of satellite S2. As discussed above, the ranging signal and the previously discussed techniques are utilized in determining the position of the mobile unit 32.

Fixed station 10 also communicates with the second user group as represented by mobile unit 36. In this environment a forward link communication signal comprised of uplink portion 76a and downlink portion 76b is transmitted from antenna 10c via transponder S2a of satellite S2 to mobile unit 36. A return link communication signal comprised of uplink portion 78a and downlink portion 78b is transmitted from mobile unit 36 via transponder S1b of satellite S1 to antenna 10b of fixed station 10. The ranging signal, which is the forward link communication signal for mobile unit 32, comprised of uplink and downlink portions 70a and 70b, is transmitted from fixed station 10. This ranging signal is comprised of uplink portion 70a and downlink portion 70b' and is transmitted from antenna 10b via transponder S1a of satellite S1 to mobile unit 36. This ranging signal and the previously discussed techniques are utilized in determining the position of mobile unit 36.

Although not illustrated it is further envisioned that communication and ranging between two user groups can be accomplished using only one transponder on each of two satellites. Each satellite would serve as a primary satellite for communications for a respective user group. Each satellite would also serve as a secondary satellite for ranging purposes for the other user group. In this case, for both satellites, a single transponder would handle both forward and return link communications for one user group in addition to the ranging signal for the other user group. The return signal from each user would be returned through a corresponding primary satellite transponder or through a designated same transponder of one of the primary or secondary satellites. In this embodiment signals would coexist in typically the same bandwidth and are identifiable from one another using known techniques.

The previous descriptions of the preferred embodiments are provided to enable any person skilled in the art to make or use the present invention. Various modifications to these embodiments will be readily apparent to those skilled in the art, and the generic principles defined herein may be applied to other embodiments without the use of the inventive facility. Thus, the present invention is not intended to be limited to the embodiments shown herein but is to be accorded the widest scope consistent with the principles and novel features enclosed herein.

We claim:

1. A method for determining the position of an object in a reference coordinate system using a fixed station and a plurality of earth orbit satellites wherein the positions of said fixed station and said satellites are known in said reference coordinate system with respect to a reference point and the distances from said fixed station to said satellites are also known, said method comprising the steps of:

transmitting from said fixed station a forward periodic signal synchronized to a fixed station transmission clock via first and second satellites to an object whose position is to be determined;

receiving at said object said forward periodic signal;

synchronizing at said object an object clock to said received forward periodic signal transmitted via said first satellite;

measuring at said object a first relative time difference in said forward periodic signal as transmitted via said first and second satellites and received at said object;

transmitting from said object to said fixed station via said first satellite a return signal synchronized with said object clock and modulated with information indicative of said first relative time difference;

receiving at said fixed station said return signal;

synchronizing at said fixed station a fixed station reception clock to said received return signal;

measuring at said fixed station a second relative time difference between said fixed station transmission and reception clocks;

calculating at said fixed station, from said first and second relative time differences, respective distances from said first and second satellites to said object; and computing the position of said object in said reference coordinate system.

2. The method of claim 1 wherein said step of transmitting said forward signal comprises the steps of:

generating a first forward periodic signal having a signal carrier swept linearly in frequency in a cyclical fashion over a first predetermined frequency range with each cycle of said first forward periodic signal carrier being of a predetermined time period, said first periodic signal capable of being modulated with information;

generating a second forward periodic signal having a signal carrier swept linearly in frequency in said cyclical fashion over a second predetermined frequency range with each cycle of said second forward periodic signal carrier being of said predetermined time period, said first and second periodic signals both synchronized to said fixed station transmission clock; and radiating said first and second forward signals from a respective fixed station antenna to a respective one of said first and second satellites.

3. The method of claim 1 wherein the step of measuring said first relative time difference comprises the step of:

measuring a percent phase offset, with respect to a forward periodic signal period, between a portion in cyclic modulation of said forward signal as received at said object via said second satellite with respect to a similar portion in cyclic modulation of said forward signal as received at said object via said first satellite.

4. The method of claim 1 wherein said step of transmitting said return signal comprises the steps of:

generating said return signal, said return signal encoded with information indicative of said first relative time difference between said forward signal as received at said object via said first and second satellites as measured just prior to transmission of said return signal; and radiating said return signal from an object antenna to said fixed station via said first satellite.

5. The method of claim 1 wherein said step of calculating respective distances from said first and second satellites to said object comprises the steps of:

determining from said second relative time difference a round trip time value corresponding to a round trip signal propagation delay of a signal traveling from said fixed station to said object and back via said first satellite;

determining from said return signal said first relative time difference by demodulating said information modulated on said return signal indicative of said first relative time difference;

determining from said round trip time value and said first relative time difference, forward propagation times for said forward signal as transmitted via said first and second satellites to said object;

determining distances that said forward signal traversed by multiplying a value corresponding to each forward propagation time by a known value corresponding to a velocity of propagation of said forward signal; and subtracting from values each corresponding to said distances said forward signal traversed, a respective value corresponding to said known distance from said fixed station to each respective satellite.

6. The method of claim 4 wherein said step of calculating respective distances from said first and second satellites to said object comprises the steps of:
   determining from said second relative time difference a round trip time value corresponding to a round trip signal propagation delay of a signal traveling from said fixed station to said object and back via said first satellite;
   determining from said return signal said first relative time difference by demodulating said information modulated on said return signal indicative of said first relative time difference;
   determining from said round trip time value and said first relative time difference, forward propagation times for said forward signal as transmitted via said first and second satellites to said object;
   determining distances that said forward signal traversed by multiplying a value corresponding to each forward propagation time by a known value corresponding to a velocity of propagation of said forward signal; and
   subtracting from values each corresponding to said distances said forward signal traversed, a respective value corresponding to said known distance from said fixed station to each respective satellite.

7. The method of claim 4 wherein the step of calculating the distance from said first satellite to said object comprises the steps of:
   commanding, on said forward signal, for said object at a particular identifiable future time referenced to said object clock to begin transmitting said return signal;
   generating a round trip signal propagation time value corresponding to said second relative time difference;
   dividing said round trip signal propagation time value in half to provide a first one-way signal propagation time value indicative of a first propagation time for said forward signal sent via said first satellite to said object;
   multiplying said first one-way signal propagation time value by a first predetermined constant value corresponding to a velocity of propagation of an electromagnetic signal between said fixed station and said first satellite, and between said first satellite and said object, to provide a first distance value corresponding to a distance travelled by said forward signal between said fixed station and said object via said first satellite; and
   subtracting from said first distance value a first known distance value corresponding to said known distance between said fixed station and said first satellite to provide a second distance value corresponding to said distance between said first satellite and said object.

8. The method of claim 7 wherein the step of calculating the distance from said second satellite to said object comprises the steps of:
   demodulating said return signal to provide a first relative time difference value corresponding to said first relative time difference;
   adding said first relative time difference value to said first one-way signal propagation time value to provide a second one-way signal propagation time value indicative of a second propagation time for said forward signal transmitted via said second satellite to said object;
   multiplying said second one-way signal propagation time value by said first predetermined constant value corresponding to a velocity of propagation of an electromagnetic signal between said fixed station and said second satellite, and between said second satellite and said object, to provide a third distance value corresponding to a distance travelled by said forward signal between said fixed station and said object via said second satellite; and
   subtracting from said third distance value a second known distance value corresponding to said known distance between said fixed station and said second satellite to provide a fourth distance value corresponding to said distance between said second satellite and said object.

9. The method of claim 4 further comprising the steps of spread spectrum modulating said return signal for transmission.

10. The method of claim 2 wherein said step of transmitting said return signal comprises the steps of:
    generating said return signal, said return signal encoded with information indicative of said first relative time difference between said forward signal as received at said object via said first and second satellites as measured just prior to transmission of said return signal; and
    radiating said return signal from an object antenna to said fixed station via said first satellite.

11. The method of claim 10 further comprising the steps of:
    modulating information, intended for said object of a first user group, upon said first forward signal for communication to said object; and
    modulating other information intended for said fixed station upon said object return signal for communication to said fixed station.

12. The method of claim 11 further comprising the steps of:
    modulating information, intended for another object of a second user group, upon said second forward signal for communication to said another object;
    transmitting another return signal from said another object, said another return signal containing information indicative of a measured time difference at said another object in reception of said first and second forward signals; and
    modulating other information intended for said fixed station upon said another object return signal for communication to said fixed station.

13. The method of claim 12 further comprising the steps of:
    relaying said first forward signal through a first transponder of said first satellite to said object and said another object;
    relaying said second forward signal through a first transponder of said second satellite to said object and said another object;
    relaying said return signal through a second transponder of said first satellite to said fixed station and
    relaying said another return signal through a second transponder of said second satellite to said fixed station.

14. The method of claim 12 further comprising the steps of:

relaying said first forward signal through a first transponder of said first satellite to said object and said another object;

relaying said second forward signal through a first transponder of said second satellite to said object and said another object;

relaying said return signal and said another return signal through a second transponder of said first satellite to said fixed station.

15. The method of claim 12 further comprising the steps of:

relaying said first forward signal through a first transponder of said first satellite to said object and said another object;

relaying said second forward signal through a first transponder of said second satellite to said object and said another object;

relaying said return signal through said first satellite first transponder to said fixed station; and relaying said another return signal through said second satellite first transponder to said fixed station.

16. The method of claim 1 wherein the steps of computing the position of said object relative to the position of said first and second satellites comprises:

trilaterating the position of said object by solving a set of three independent nonlinear equations having unknown object position components in cartesian x-y-z coordinates, known satellite components in cartesian x-y-z coordinates, a known approximate distance from the center of the earth to said object and measured respective distances from said first and second satellites to said object.

17. A method of object position determination using a plurality of earth orbiting satellites and a fixed station whose positions are known in an Earth-Centered-Earth-Fixed (ECEF) coordinate frame and an earth shape model in which the distance from the center of the earth to any location on the surface of the earth is known within said ECEF coordinate frame, comprising the steps of:

simultaneously transmitting from a fixed station first and second forward periodic signal, synchronized to a fixed station forward transmission clock, via first and second satellites respectively to an object whose position is to be determined;

receiving said first and second forward signals at said object, said first forward signal bearing information indicative of a future time frame which said object will begin transmitting a return signal according to an object clock synchronized to said first forward signal as received at said object;

measuring at said object a percent phase offset of a total modulation period between similar portions or received carrier modulation of said first and second forward signals, said percent offset corresponding to a first relative time difference in said first and second forward signals as received at said object;

transmitting from said object via said first satellite to said fixed station said return signal encoded with information indicative of said first relative time difference;

measuring at said fixed station a round trip delay where said round trip delay is a second relative time difference between said fixed station forward transmission clock and a fixed station return reception clock synchronized with said return signal as received at said fixed station;

calculating a first distance from said first satellite to said object according to said round trip delay;

calculating a second distance from said second satellite to said object according to said round trip delay and said first relative time difference; and calculating a position of said object within said ECEF coordinate frame according to said first and second distances and said earth shape model.

18. The method of claim 17 wherein said object whose position is to be determined is a vehicle having a mobile communication terminal capable of two-way communications with said fixed station via at least one of said plurality of earth satellites.

19. The method of claim 18 wherein said fixed station is capable of independently initiating a vehicle location determination command and capable of two-way communications with said vehicle mobile communication terminal.

20. The method of claim 17 further comprising the step of initially determining the respective positions of said first and second satellites within said reference ECEF coordinate system.

21. The method of claim 20 wherein the step of determining said positions of said first and second satellites comprises:

determining respective distances from each of said first and second satellites to first, second and third fixed observing sites whose positions are known relative to an approximate center of the earth; and trilaterating said positions of said first and second satellites by solving for each of said first and second satellites a set of three independent nonlinear equations having unknown satellite position components in cartesian x-y-z coordinates, known fixed observing site position components in ECEF cartesian x-y-z coordinates and measured respective distances from said first, second and third fixed observing sites to a corresponding one of said first and second satellites.

22. A system for determining the position of an object in an Earth-Centered-Earth-Fixed reference coordinate system using a fixed station located at a known position and a plurality of earth orbit satellites whose positions are also known along with the distances between the fixed station and the satellites, comprising:

first communication means located at said fixed station for, generating a periodic signal synchronized to a first communication means transmission clock and transmitting said periodic signal to said object via at least two of said satellites;

second communications means located at said object for, receiving said periodic signal, synchronizing a second communications means clock to said received periodic signal transmitted via a first satellite of said at least two of said satellites and received by said second communications means, measuring a first relative time difference between said periodic signal as transmitted via said first satellite and a second satellite of said at least two of said satellites and received by said second communications means, generating a return signal indicative of said first relative time difference, and transmitting said return signal via said first satellite to said first communications means; and wherein said first communication means further is for, receiving said return signal, synchronizing a first communications means reception clock to said received return signal, measuring a second relative time difference between said first communications means transmission and reception clocks, determining from said first and second relative time differences and said known distances between said first and second satellites respective distances between said first and second satellites and said object, and for determining from said known positions of said first and second satellites, said distances between said first and second satellites to said object and a known distance from said object to a reference point within said reference coordinate system, said object position.

23. The system of claim 22 wherein said first and second communications means are capable of two-way communications with respect to one another via said plurality of satellites.

24. The system of claim 22 wherein said first communications means is capable of independently initiating an object position determination.

25. The system of claim 22 further comprising satellite tracking means for determining the respective position of each one of said satellites within said ECEF coordinate system.